United States Patent
Hsieh

(10) Patent No.: US 10,589,416 B1
(45) Date of Patent: Mar. 17, 2020

(54) TOOL HOLDER

(71) Applicant: Chih-Chien Hsieh, Taichung (TW)

(72) Inventor: Chih-Chien Hsieh, Taichung (TW)

( * ) Notice: Subject to any disclaimer, the term of this patent is extended or adjusted under 35 U.S.C. 154(b) by 0 days.

(21) Appl. No.: 16/414,219

(22) Filed: May 16, 2019

(51) Int. Cl.
*B25H 3/04* (2006.01)
*F16B 2/22* (2006.01)
*B25H 3/00* (2006.01)

(52) U.S. Cl.
CPC ............. *B25H 3/04* (2013.01); *B25H 3/006* (2013.01); *F16B 2/22* (2013.01)

(58) Field of Classification Search
CPC ............. B25H 3/04; B25H 3/006; F16B 2/22
USPC ........................................................ 211/70.6
See application file for complete search history.

(56) References Cited

U.S. PATENT DOCUMENTS

| | | | | |
|---|---|---|---|---|
| 2,371,433 A * | 3/1945 | Davis | ........................ | B25H 3/04 211/70.6 |
| 4,159,773 A * | 7/1979 | Losenno | ................. | A47G 29/08 211/70.6 |
| 4,781,608 A * | 11/1988 | Hillmann | ................ | B60M 1/307 211/94.01 |
| 5,165,629 A * | 11/1992 | Breveglieri | ........... | A47F 5/0884 211/60.1 |
| 5,228,570 A * | 7/1993 | Robinson | ................. | B25H 3/06 206/375 |
| 5,715,951 A * | 2/1998 | Dembicks | ............... | B25B 13/56 206/378 |
| 6,070,745 A * | 6/2000 | Dembicks | ................ | B25H 3/06 206/378 |
| 6,168,018 B1 * | 1/2001 | Ramsey | .................... | B25H 3/06 206/378 |
| 6,450,338 B1 * | 9/2002 | Chen | ...................... | B25H 3/003 206/378 |
| 6,488,151 B2 * | 12/2002 | Ramsey | .................... | B25H 3/06 206/378 |
| 7,108,132 B2 * | 9/2006 | Shih | ........................ | B25B 13/56 206/378 |
| 7,152,747 B2 * | 12/2006 | Wang | .................... | A47F 5/0006 211/70.6 |
| 7,717,278 B2 * | 5/2010 | Kao | ......................... | B25H 3/04 206/349 |
| 7,882,965 B1 * | 2/2011 | Kao | ......................... | B25H 3/04 211/106.01 |
| 8,096,516 B2 * | 1/2012 | Shiao | ....................... | B25H 3/04 211/70.6 |
| 8,302,786 B2 * | 11/2012 | Kao | ....................... | A47F 5/0846 211/70.6 |

(Continued)

FOREIGN PATENT DOCUMENTS

| | | | | |
|---|---|---|---|---|
| FR | 2846950 A1 * | 5/2004 | ............... | B25H 3/04 |
| FR | 3018713 B1 * | 4/2016 | ............. | B25H 3/003 |

*Primary Examiner* — Stanton L Krycinski
(74) *Attorney, Agent, or Firm* — Egbert Law Offices, PLLC

(57) ABSTRACT

A tool holder has a long base and a positioning structure disposed in the base, wherein the positioning structure includes a plugged impression, a basal part, a connecting part and two clamping arms. The plugged impression is provided with a convex column for positioning the socket. The clamping arms are opposite to each other for positioning the socket wrench or other tool. The positioning structure can improve the convenience of the tool user to take and store the socket and the socket wrench, and the disposed stability is high.

4 Claims, 9 Drawing Sheets

(56) References Cited

U.S. PATENT DOCUMENTS

| | | | | |
|---|---|---|---|---|
| 8,403,155 B1* | 3/2013 | Kao | ............... | B25H 3/04 |
| | | | | 206/376 |
| 8,479,929 B1* | 7/2013 | Kao | ............... | B25H 3/04 |
| | | | | 211/69 |
| 8,733,561 B2* | 5/2014 | Kao | ............... | B25H 3/04 |
| | | | | 206/378 |
| 8,733,562 B2* | 5/2014 | Kao | ............... | B25H 3/04 |
| | | | | 206/378 |
| 9,144,306 B2* | 9/2015 | Kao | ............... | A47B 81/00 |
| 9,205,552 B2* | 12/2015 | Kao | ............... | F16M 13/022 |
| 9,375,836 B2* | 6/2016 | Su | ............... | B25H 3/04 |
| 9,527,206 B1* | 12/2016 | Hsieh | ............... | B25H 3/003 |
| 9,538,862 B2* | 1/2017 | Kao | ............... | A47F 5/08 |
| 9,539,721 B1* | 1/2017 | Kao | ............... | B25H 3/003 |
| 2005/0102793 A1* | 5/2005 | Shih | ............... | B25H 3/003 |
| | | | | 16/96 R |
| 2006/0219647 A1* | 10/2006 | Shih | ............... | B25H 3/003 |
| | | | | 211/70.6 |
| 2007/0017886 A1* | 1/2007 | Kao | ............... | A47F 5/0807 |
| | | | | 211/94.01 |
| 2010/0072341 A1* | 3/2010 | Kao | ............... | B25H 3/04 |
| | | | | 248/340 |
| 2011/0180500 A1* | 7/2011 | Kao | ............... | B25H 3/04 |
| | | | | 211/70.6 |
| 2012/0248051 A1* | 10/2012 | Kao | ............... | B25H 3/04 |
| | | | | 211/70.6 |
| 2016/0016306 A1* | 1/2016 | Haddon | ............... | B25H 3/04 |
| | | | | 211/70.6 |

* cited by examiner

TOOL HOLDER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a positioning device for the tools, and more particularly to a tool holder with an innovative structure.

2. Description of Related Art Including Information Disclosed Under 37 CFR 1.97 and 37 CFR 1.98

A conventional tool holder for disposing the socket comprises a long slide rail and a plurality of socket seats disposed on the slide rail, each socket seat can slide along the slide rail, each socket seat respectively has a convex column, the slide rail can be arranged on a vertical face or a plane. When the socket is disposed by each socket seat, said socket is sleeved on the convex column.

Tool users often need to use a variety of hand tools with different types and functions. Said tool holder cannot dispose other hand tools other than a socket, which causes that tool users are inconvenient in taking and storing tools.

BRIEF SUMMARY OF THE INVENTION

The main object of the present invention is to provide a tool holder, which aims to solve the technical problems, and develop a more practical utility type for disposing the socket and other tools, in order to improve the convenience of tool use and storage.

Another object of the present invention is to achieve the advantages of high stability and utility by means of the relative composition of the base and the positioning structure.

For the foregoing purposes, the technical characteristics of the present invention for solving the problem in the tool holder mainly include:

a long base, the base has a sliding chute at the top edge concave, the sliding chute is extended at both ends of the base; and a positioning structure is disposed in the base, so that the positioning structure is slid back and forth along the sliding chute; the positioning structure comprises: a plugged impression, a basal part, a connecting part and two clamping arms, wherein the plugged impression is connected with the basal part by the connecting part. The plugged impression is embedded in the sliding chute, and the plugged impression has a convex column on the top edge convex. The convex column is provided with a positioning part at one side, so that the convex column can position a socket, the convex column center line passes through the two ends of the convex column, and one end of the center line extends through the sliding chute;

The basal part is laterally opposite to the base, and each clamping arm is respectively connected to the basal part, and each clamping arm is extended upwardly, so that each clamping arm can position a tool;

As the bottom edge of the base and the bottom edge of the basal part are in a highly flush correspondence, the steadiness of the tool holder can be improved accordingly.

The main effects and advantages of the present invention are the ability to dispose the frequently-used socket and socket wrenches, to improve the accessibility and storage convenience of the tool, and the stability of the disposed tool holder is high.

DETAILED DESCRIPTION OF THE INVENTION

Each figure shows a concrete and feasible embodiment of the tool holder of the present invention, such embodiment is for illustration only and it is not subject to such structure in patent application.

Figure 1:
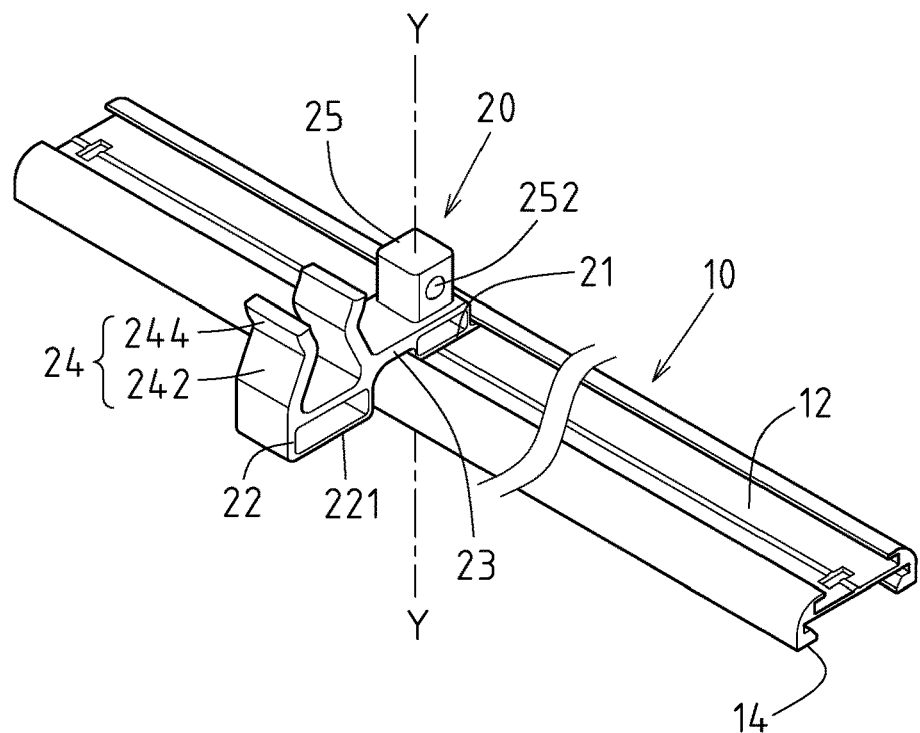
FIG. 1 is a three-dimensional diagram of Embodiment 1 of the present invention.
Figure 2:
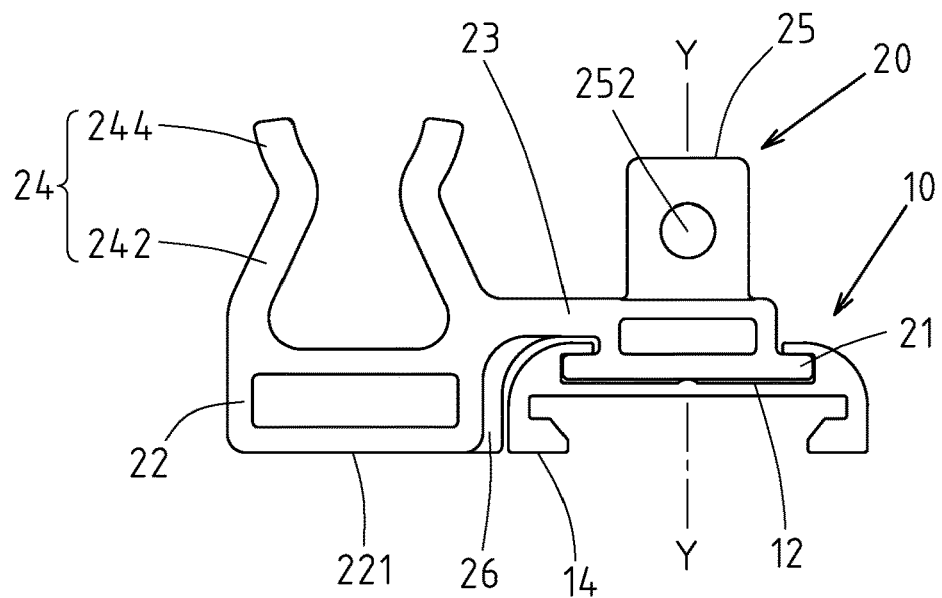
FIG. 2 is a right side view of Embodiment 1 of the present invention.

As shown in FIGS. 1 and 2, Embodiment 1 of the tool holder of the present invention includes a long base 10 and a positioning structure 20, wherein the base 10 has a sliding chute 12 at a top edge concave, and the sliding chute 12 is extended to both ends of the base 10, the positioning structure 20 is disposed in the base 10, and can be slid back and forth along the sliding chute 12, the bottom edge 14 of the base 10 is a plane.

Figure 4:
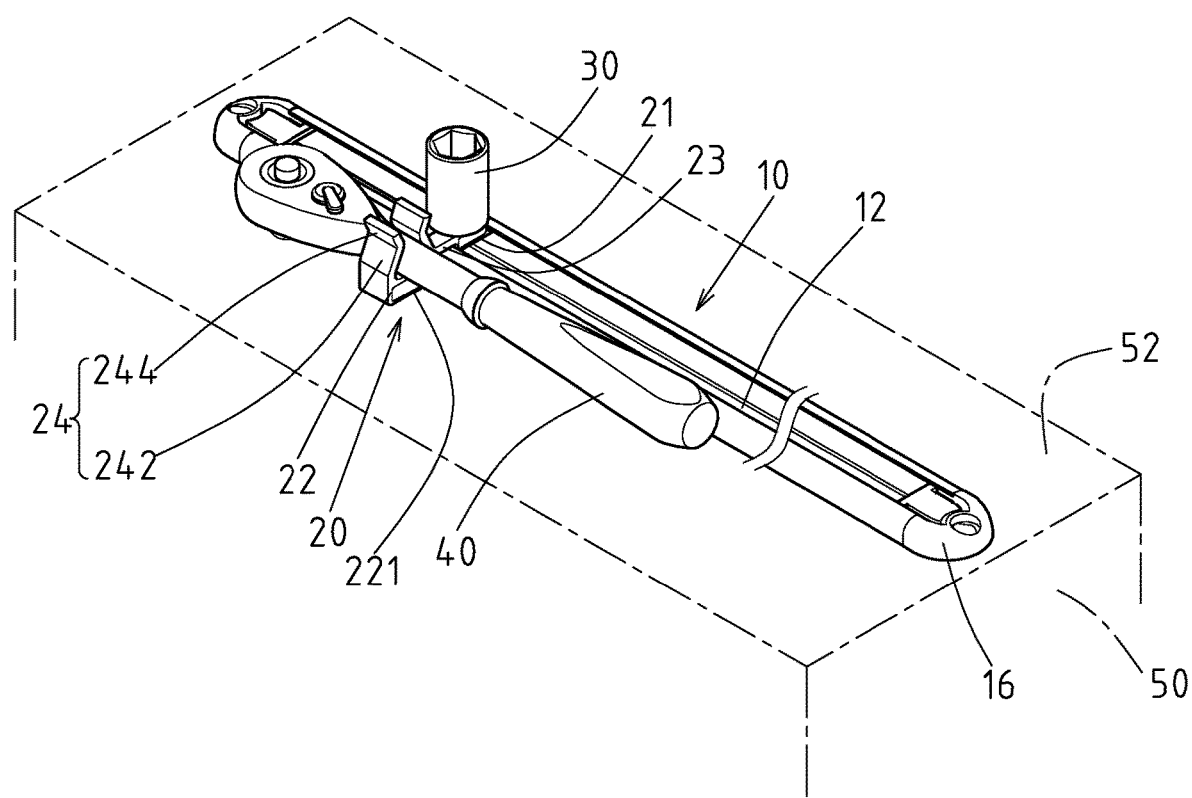
FIG. 4 is a three-dimensional schematic diagram of Embodiment 1 of the present invention, disposed with the two sealing members in a flat use state.

The positioning structure 20 includes a plugged impression 21, a basal part 22, a connecting part 23 and two clamping arms 24, wherein the plugged impression 21 is embedded in the sliding chute 12, so that the positioning structure 20 is slid back and forth along the sliding chute 12, the plugged impression 21 is connected with the basal part 22 by the connecting part 23. The plugged impression 21 has a convex column 25 at the top edge convex, and the convex column 25 is provided with a positioning part 252 at one side, so that the convex column 25 can position a socket 30 (as shown in FIG. 4). The center line YY of the convex column 25 is defined as a central virtual line passing through both ends of the convex column 25. One end of the center line YY extends through the sliding chute 12, and the basal part 22 is laterally opposite to the base 10. The bottom edge 14 of the base 10 and the bottom edge 221 of the basal part 22 are in a highly flush correspondence, so that the stability of the tool holder is improved; further, the bottom edge 221 of the basal part 22 is plane, thereby improving the stability of the tool holder.

Each clamping arm 24 is respectively connected with the basal part 22, and each clamping arm 24 extends upwardly, so that the clamping arm 24 is used for positioning the tools, and the clamping arms 24 are symmetrical with each other, and each clamping arm 24 mainly includes a first section 242 and a second section 244. One end of the first section 242 is connected with the basal part 22, and the other end of the first section 242 is connected with the second section 244. The distance between each clamping arm 24 and the opposite first section 242 is decreased toward the other end of each clamping arm 24 from the basal part 22, so that a socket wrench 40 (shown as in FIG. 4) enters between the first sections 242, and one end of each first section 242 connected with each second section 244 forms a backstop to the socket wrench 40.

Figure 3:
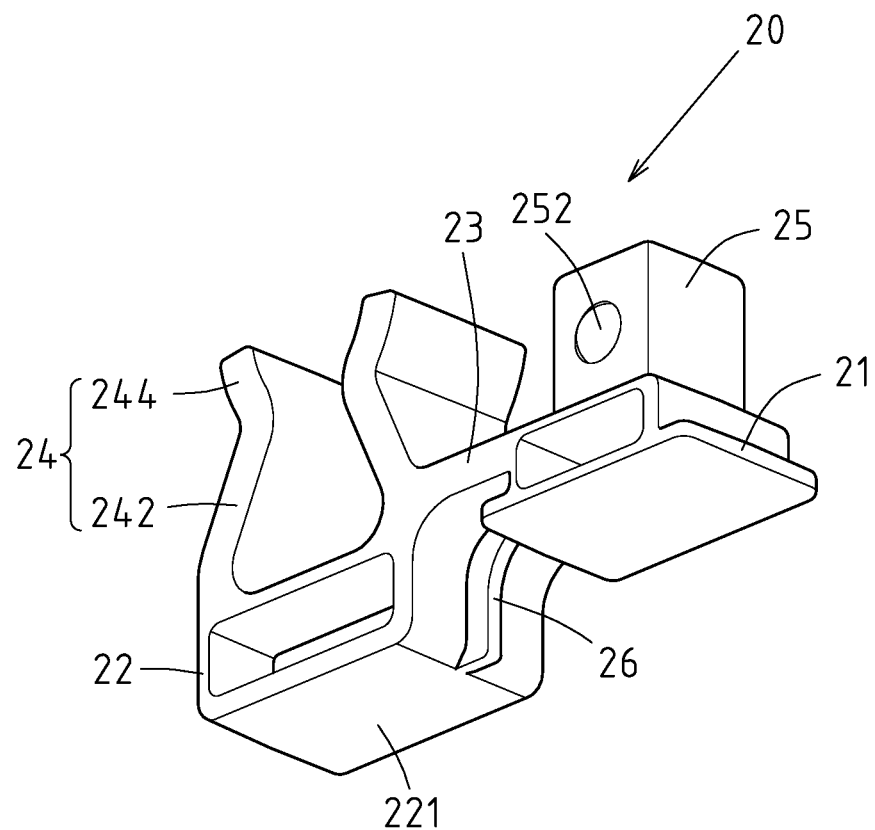
FIG. 3 is a three-dimensional diagram of the positioning structure of Embodiment 1 of the present invention at an angle of elevation.

As shown in FIGS. 2 and 3, the positioning structure 20 is provided with a rib 26 on the bottom edge of the connecting part 23 and the opposite side of the basal part 22 adjacent to the base 10, the rib 26 forms a reinforcing effect on the connecting part 23 and the basal part 22. When the socket wrench is disposed in the positioning structure 20, the strength of the positioning structure 20 for supporting the socket wrench weight is increased; further, when the positioning structure 20 positions the socket wrench of various specifications and sizes, the rib 26 can increase the length of the connecting part 23, and the lateral distance between the basal part 22 and the base 10 can be improved, so that the socket wrench positioned between the clamping arms 24 and the socket positioned on the convex column 25 do not touch each other or even interfere with each other, and the convenience of the socket and the socket wrench in the positioning structure 20 is improved.

As shown in FIG. 4, when the socket 30 and the socket wrench 40 are positioned by using the Embodiment 1, the base 10 can be respectively provided with a stopper 16 at both ends, and both ends of the sliding chute 12 are closed by the stopper 16, so that the positioning structure 20 will not be arbitrarily removed from the base 10 by one end of the sliding chute 12.

Figure 5:
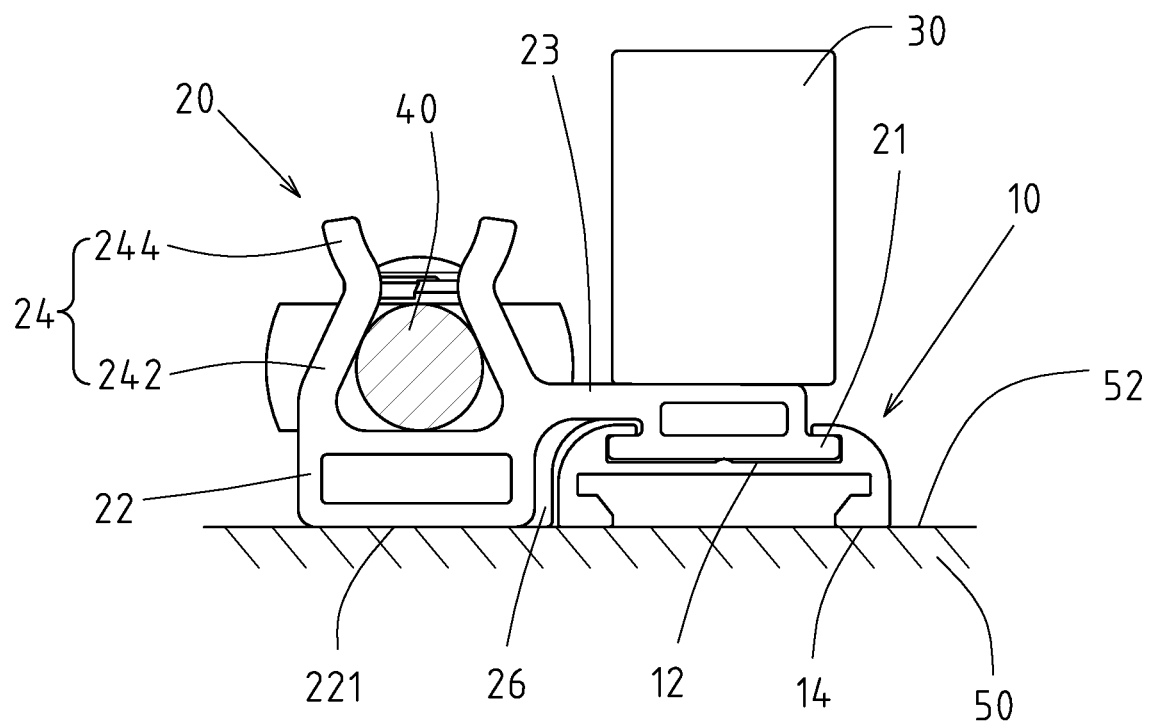
FIG. 5 is a right side view of the base and positioning structure of Embodiment 1 of the present invention in a flat use state.

FIGS. 4 and 5 show that a flat state of the Embodiment 1 is disposed in a use state of surface 52 of a setting object 50, wherein the setting object 50 may be a worktable or a tool cabinet, and the base 10 is disposed on the surface 52, and the base 10 can be positioned on the surface 52 by using a screw (not shown in the figure) or a magnetic object (not shown in the figure), please refer to FIGS. 1-5. The socket 30 is sleeved on the convex column 25, and the positioning part 252 is embedded in a recess (not shown in the figure) inside the socket 30 (not shown in the figure), so that the socket 30 is positioned in the convex column 25, the socket wrench 40 is disposed between each clamping arm 24, so that the socket wrench 40 is positioned in the positioning structure 20.

Figure 6:
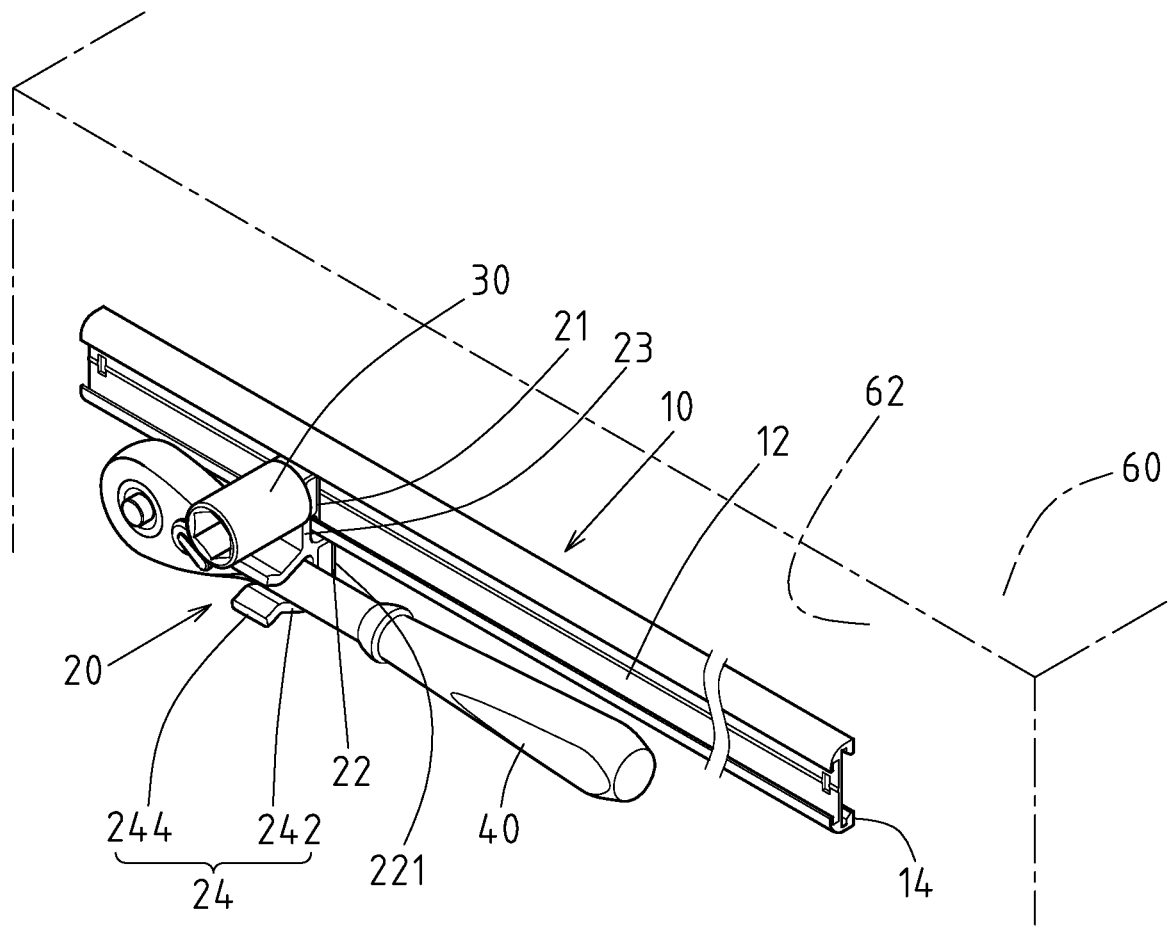
FIG. 6 is a three-dimensional schematic diagram of Embodiment 1 of the present invention in a vertical use state.
Figure 7:
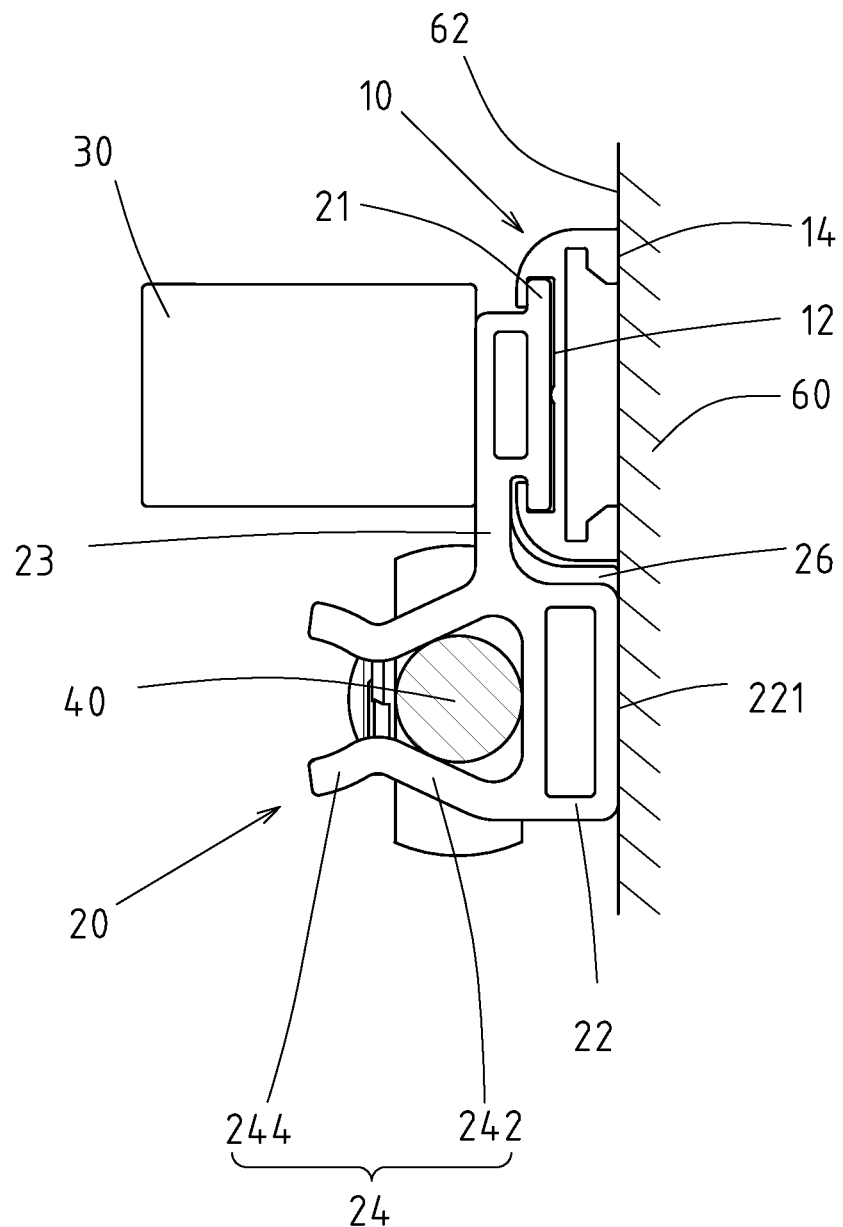
FIG. 7 is a right schematic diagram of Embodiment 1 of the present invention in a vertical use state.

FIGS. 6 and 7 show that a vertical state of the Embodiment 1 is disposed in a use state of a surface 62 of a setting object 60, wherein the setting object 60 may be a wall or a tool cabinet, and the surface 62 is formed in the vertical face of the setting object 60, and the base 10 can be selectively positioned on the surface 62 by using the screw (not shown in the figure) or magnetic object (not shown in the figure); please refer to FIGS. 1 and 2 as well as FIGS. 6 and 7, the socket 30 is sleeved on the convex column 25, and the positioning part 252 is embedded in a recess (not shown in the figure) inside the socket 30, so that the socket 30 is positioned in the convex column 25, and the socket wrench 40 is disposed between each clamping arm 24, so that the socket wrench 40 is positioned in the positioning structure.

The positioning structure 20 can be used to dispose the socket 30 and the socket wrench 40 which are often used together, thereby improving the convenience of the tool user in taking and storing the socket 30 and the socket wrench 40.

As shown in FIGS. 5-7, since the bottom edge 14 of the base 10 and the bottom edge 221 of the basal part 22 are in a in a highly flush correspondence, so that the base 10 and the basal part 22 can be abutted against the surface 52 and 62, the setting object 50 and 60 can support the base 10 and the basal part 22, and the tool holder is disposed with high stability. When the socket wrench 40 is disposed by each clamping arm 24, the weight of the socket wrench 40 acts on the basal part 22, the setting object 50 and 60 can support the base 10 and the basal part 22, so that the basal part 22 and the connecting part 23 will not be deformed by the weight of the socket wrench 40.

Figure 8:
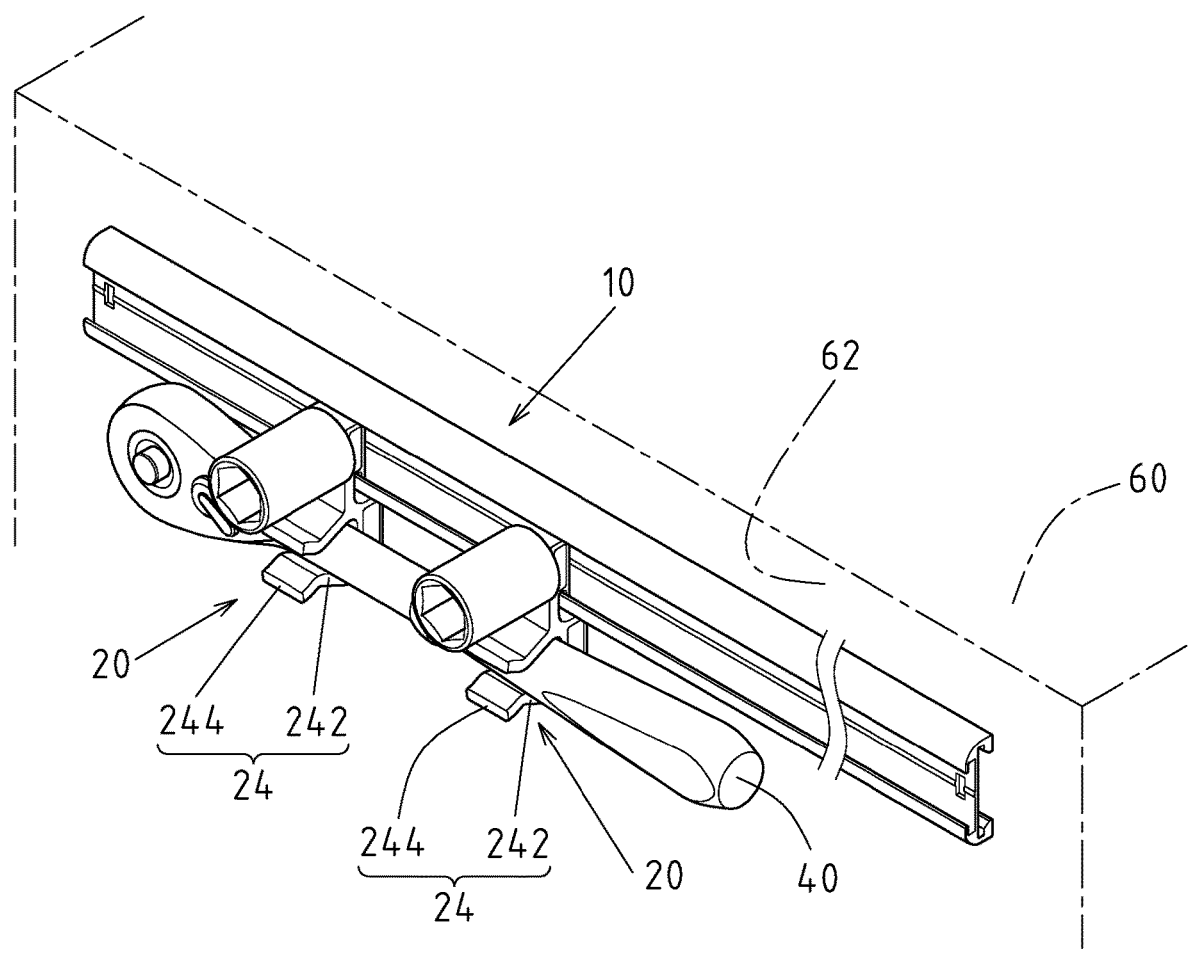
FIG. 8 is a three-dimensional schematic diagram of Embodiment 1 of the present invention in another vertical use state.

Further, each clamping arm 24 can also be applied to a tool for positioning other long shapes, and the Embodiment 1 can increase the number of the positioning structure 20 according to the shape and size of the tool to be disposed. As shown in FIG. 8, the plural positioning structures 20 are used to clamp each part of the socket wrench 40 respectively by the clamping arm 24, thereby improving the positioning stability of the tool.

Figure 9:
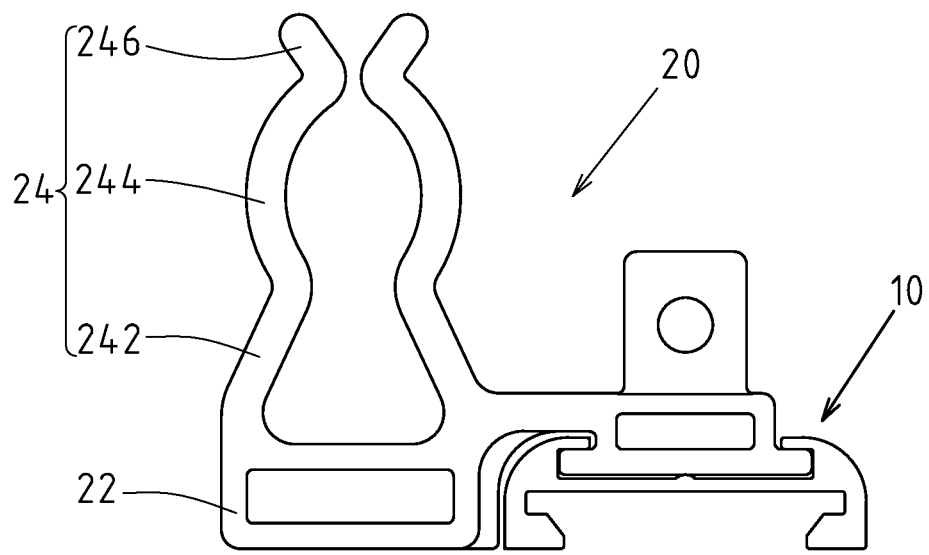
FIG. 9 is a right side view of Embodiment 2 of the present invention.

FIG. 9 shows that the Embodiment 2 is obtained based on the change of the Embodiment 1. The Embodiment 2 includes a long base 10 and a positioning structure 20, and the same composition of the Embodiment 2 and the Embodiment 1 is not repeatedly described. The composition of the Embodiment 2 different from the Embodiment 1 is mainly that two clamping arms 24 of the positioning structure 20 respectively include a first section 242, a second section 244 and a guiding section 246. Wherein, the first section 242 is connected with a basal part 22, the another end of the first section 242 is connected to the second section 244, the second section 244 is curved, and the curved center of the second section 244 is located between each clamping arm 24, and one end of the guiding section 246 is connected with one end of the second section 244 away from the basal part 22. The distance between each clamping arm 24 and the opposite guiding section 246 is increased toward the tail end of each clamping arm 24 from one end of the adjacent basal part 22, so that each guiding section 246 guides the tool into between the second sections 244.

Figure 10:
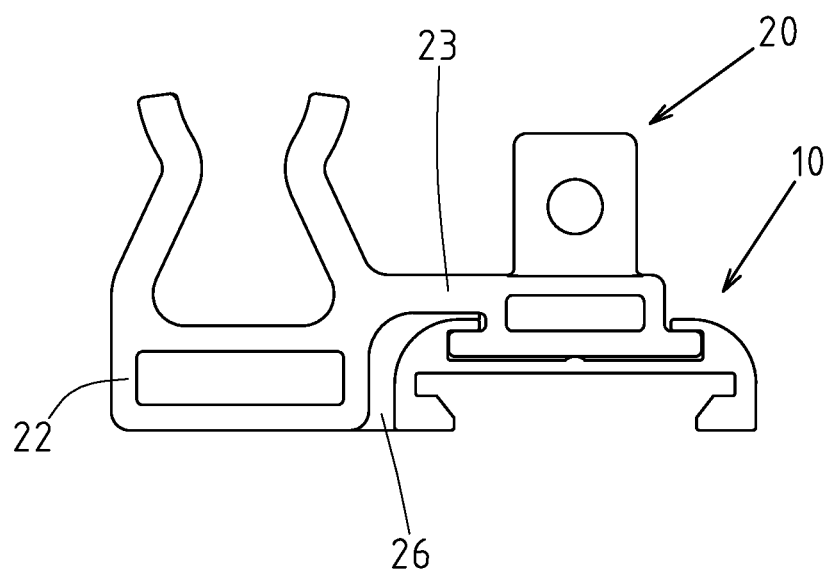
FIG. 10 is a right side view of Embodiment 3 of the present invention.

FIG. 10 shows that the Embodiment 3 is obtained based on the change of the Embodiment 1, and the Embodiment 3 includes a long base 10 and a positioning structure 20. The same composition of the Embodiment 3 and the Embodiment 1 is not repeatedly described. The composition of the Embodiment 3 different from the Embodiment 1 is mainly that mainly that the positioning structure 20 is provided with a rib 26 at the opposite side of bottom edge of the connecting part 23 and the basal part 22 adjacent to the base 10, and the rib 26 is abutted against the base 10. Accordingly, the basal part 22 and the base 10 are positioned oppositely each other. In order to change the disposed position of the tool holder, when the tool holder needs to be moved, the basal part 22 will not be shaken during the movement, and the rib 26 can increase the strength of the basal part 22 and the connecting part 23. When the socket wrench 40 is disposed by each clamping arm 24, the weight of the socket wrench 40 acts on the basal part 22, the rib 26 can avoid that the basal part 22 and the connecting part 23 are deformed due to the weight of the socket wrench 40, and the base 10 can support the rib 26, the basal part 22 and the connecting part 23, thereby improving the stability of the tool holder.

Figure 11:
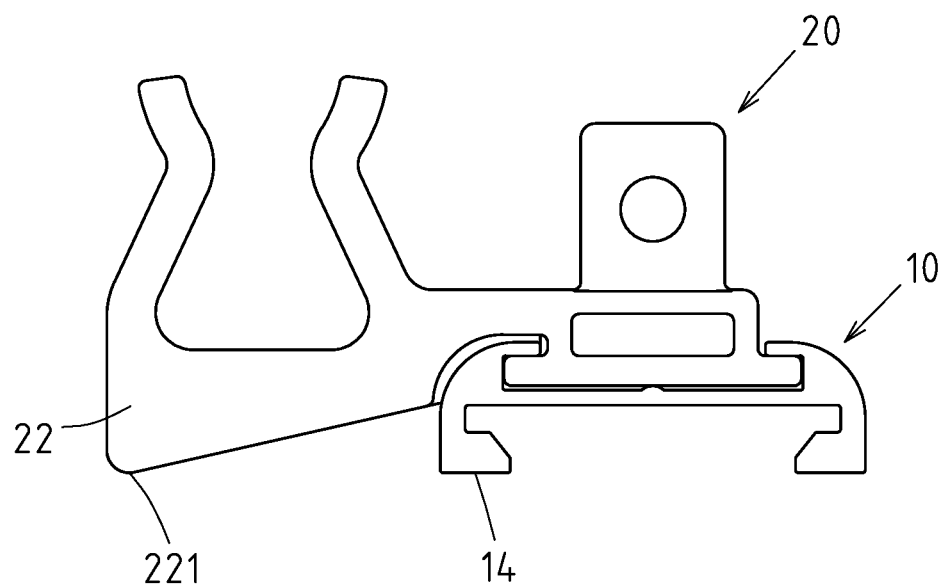
FIG. 11 is a right side view of Embodiment 4 of the present invention.

The foregoing Embodiment 1 can be further changed to the Embodiment 4, as shown in FIG. 11, and the Embodiment 4 includes a long base 10 and a positioning structure 20. The Embodiment 4 differs from the Embodiment 1 mainly in that the bottom edge 221 of the basal part 22 of the positioning structure 20 is pointed.

Figure 12:
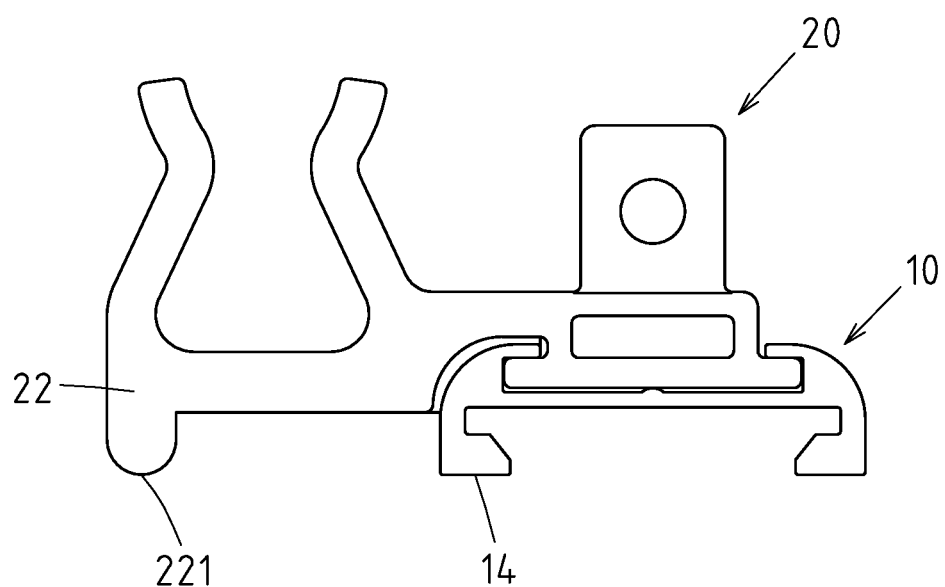
FIG. 12 is a right side view of Embodiment 5 of the present invention.

The foregoing Embodiment 1 can be further changed to the Embodiment 5, as shown in FIG. 12, and the Embodiment 5 includes a long base 10 and a positioning structure 20. The Embodiment 5 differs from the Embodiment 1 mainly in that the bottom edge 221 of the basal part 22 of the positioning structure 20 is curved.

The bottom edge 221 of the basal part 22 of the foregoing Embodiment 1 can be further changed to other non-plane shape, thereby composing other modified embodiments of the present invention, and such changes are readily thinkable on the basis of the teachings provided in Embodiment 4 and Embodiment 5.

I claim:

1. A tool holder comprising:
   a base having a sliding chute at a concave top edge thereof, the sliding chute extending to opposite ends of said base; and
   a positioning structure disposed on said base, said positioning structure being slidable back-and-forth along the sliding chute, said positioning structure comprising:
   a plugged impression;
   a basal part laterally opposite said base;
   a connecting part connecting said plugged impression to said basal part;
   a pair of clamping arms, wherein said plugged impression is embedded in the sliding chute, said plugged impression having a convex column on a top edge thereof, the convex column having a positioning part at one side thereof, the convex column having a center line passing through opposite ends thereof, one end of the center line extending through the sliding chute, each of said pair of clamping arms being connected to said basal part, each of said pair of clamping arms extending upwardly and adapted to position a tool, a bottom edge of said base being flush with a bottom edge of said basal part, the bottom edge of said basal part being planar, said positioning structure having a rib at a bottom edge of said connecting part and said basal part adjacent to a side of said base.

2. The tool holder of claim 1, wherein the rib abuts against said base.

3. The tool holder of claim 2, wherein said pair of clamping arms are symmetrical with each other, each of said pair of clamping arm having a first section and a second section, one end of the first section being connected to said basal part, another end of the first section being connected to the second section, a distance between each of said pair of clamping arms and an opposite end of the first section is decreased toward an end of each of said pair of clamping arms from said basal part, one end of each of the first sections being connected with each second section so as to form a backstop.

4. The tool holder of claim 3, wherein each of said pair of clamping arms has a guiding section, the second section being curved, a curved center of the second section being located between said pair of clamping arms, wherein one end of the guiding section is connected with one end of the second section away from said basal part, a distance between each of said pair of clamping arms and the guiding section is increased toward a tail end of each of said pair of clamping arms from one end of said basal part, the guiding section adapted to guide the tool between the second sections.

* * * * *